Feb. 21, 1939.   F. N. PRINCE   2,148,218
SOLDERING MECHANISM FOR CAN BODIES
Filed June 2, 1936   2 Sheets-Sheet 1
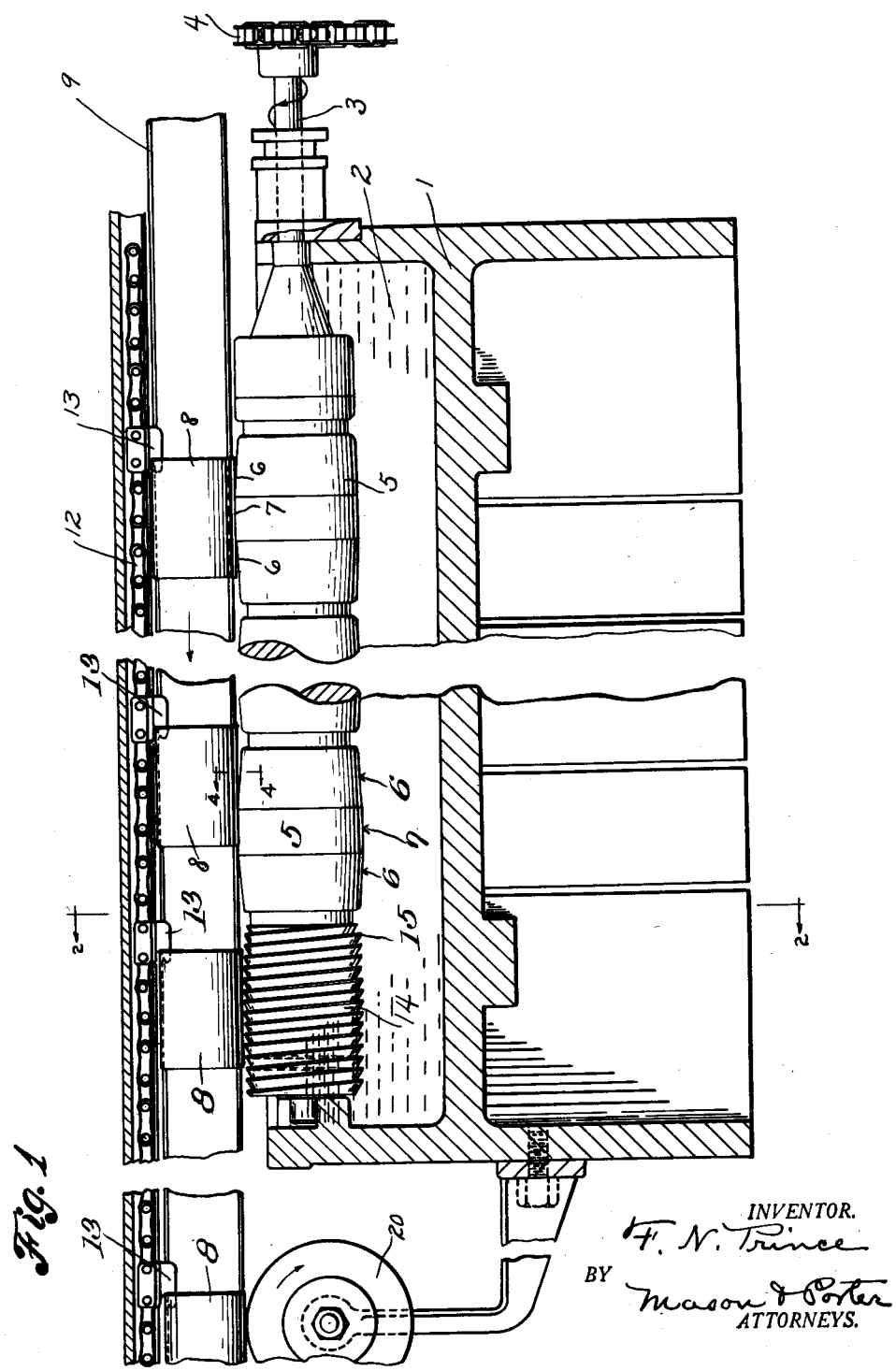
INVENTOR.
F. N. Prince
BY Mason & Porter
ATTORNEYS.

Feb. 21, 1939.     F. N. PRINCE     2,148,218
SOLDERING MECHANISM FOR CAN BODIES
Filed June 2, 1936      2 Sheets-Sheet 2
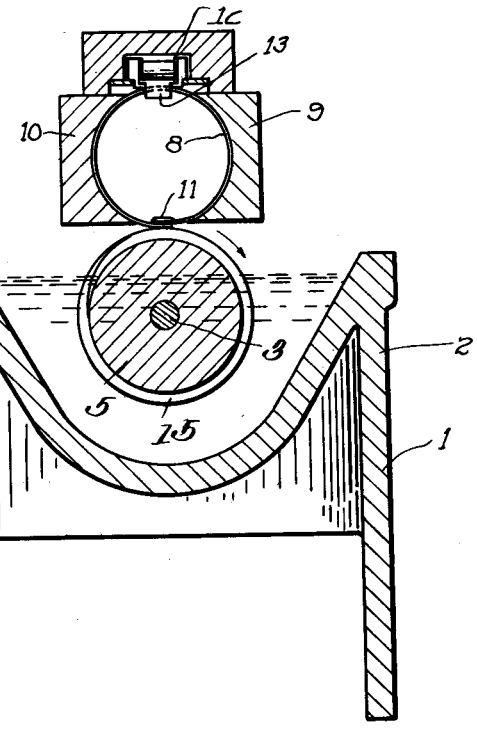
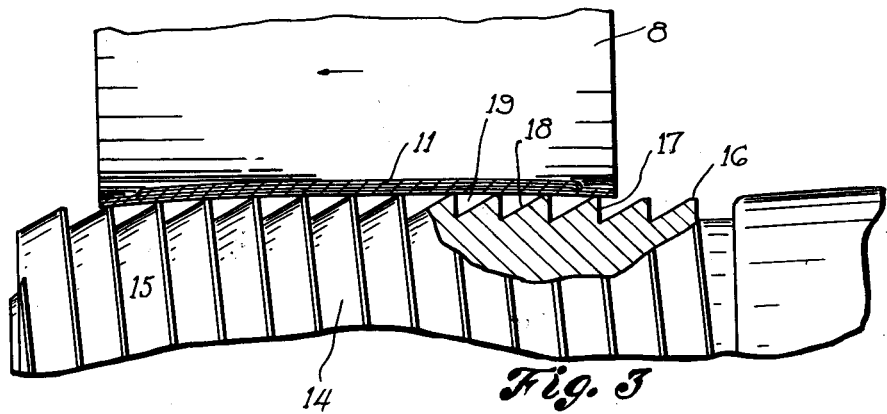
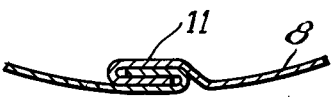
INVENTOR.
F. N. Prince
BY Mason & Porter
ATTORNEYS.

Patented Feb. 21, 1939

2,148,218

UNITED STATES PATENT OFFICE 2,148,218

SOLDERING MECHANISM FOR CAN BODIES

Frank Nathan Prince, Brooklyn, N. Y., assignor to Continental Can Company, Inc., New York, N. Y., a corporation of New York Application June 2, 1936, Serial No. 83,151

2 Claims. (Cl. 113—61)

The invention relates to new and useful improvements in a soldering mechanism for applying solder to the side seam of a can body.

An object of the invention is to provide a soldering mechanism wherein the solder applying roll is equipped with means for distributing the solder along the side seam.

A further object of the invention is to provide a solder applying mechanism of the above type wherein the surplus solder is stripped from the side seam and returned to the solder bath.

In the drawings—

Figure 1 is a longitudinal sectional view through the soldering bath showing a solder roll having the improvements applied thereto;

Fig. 2 is a transverse sectional view on the line 2—2 of Fig. 1,

Fig. 3 is an enlarged detail view showing the solder distributing and stripping means with a can body passing over the same, and Fig. 4 is a sectional view on an enlarged scale through the side seam of the can body.

The invention has to do with a soldering mechanism for applying solder to the side seam of a can body. A great deal of difficulty has been experienced in the wiping of the side seam, due to the fact that the solder is thrown by the wiper into the can body, which is objectionable, particularly in connection with can bodies having the interior thereof enameled. This is due in part to the presence of surplus solder adhering to the can body along the side seam which is removed by the wiper. The present invention resides in an improved form of solder applying mechanism wherein the solder is distributed more uniformly along the side seam and the surplus solder is stripped from the side seam before the can body contacts with the wiper. This is accomplished by providing the solder roll which rotates in the solder bath and applies the solder to the side seam with one or more sections which are constructed so as to provide a helical rib. The face of the helical rib approached by the dogs on the feed chain consists of line elements extending substantially radial of the axis of the roll. The other face of the rib is inclined so as to provide a suitable clearance space. The rib, as noted, is helical, and is so placed on the roll relative to its direction of rotation, that the solder when the side seam contacts with this portion of the solder applying roll, is crowded or fed back along the side seam, and this more efficiently distributes the solder along the side seam. Furthermore, it will strip the surplus solder from the side seam to a great extent, and the surplus solder thus stripped is returned to the solder bath. By this stripping of the surplus solder from the side seam, the splashing or throwing of solder by the wiping roll when the can body passes over the same, is, to a large extent, eliminated.

It is thought the invention will be better understood by a more specific reference to the present illustrated embodiment thereof. In the drawings, the solder applying mechanism includes a suitable frame 1 which is constructed so as to provide a solder bath 2. The details of construction of the solder bath and the manner of heating the solder form no part of the present invention and have been omitted from the drawings.

Mounted for rotation in the solder bath is a solder applying roll which is journaled in suitable bearings carried by the frame supporting the solder bath. The solder roll carries a shaft which extends out through the bearings, which shaft is indicated at 3. A sprocket chain 4 running over a suitable sprocket wheel on the shaft rotates the shaft in the direction of the arrow in Fig. 1. The solder roll includes several sections, all of which are alike, and these sections are indicated at 5. Each section 5 has tapered surfaces 6, 6 which meet at the center in a cylindrical surface 7. These surfaces merge one into the other and provide a surface which contacts with the can seam. The can bodies are indicated at 8 in the drawings. The can body is preferably guided through an outside horse which includes guiding members 9 and 10 (see Fig. 2). These sections of the horse are spaced at the lower side so that the side seam 11 will be exposed and caused to contact with the solder applying roll. The can bodies are moved through the horse by a feed chain 12 which is provided with a series of dogs 13 that engage the can bodies and move the same along the soldering roll in proper timed relation to each other. This means for feeding the can bodies and presenting the same to the solder roll is of a well known construction and does not need further description.

The novel feature of the present invention is found in the section 14 of the solder applying roll. This section 14 is provided with a helical rib 15. This helical rib 15 has a narrow flat face 16. The can body passes over the section 14 in the direction indicated by the arrow in Figures 1 and 3. The face of the rib which is approached by the dogs on the feed chain consists of line elements which are radial of the axis of the solder roll. This face is indicated at 17 and it will be noted that it is substantially at right angles to the path of travel of the can body over the section 14. The other face 18 is inclined to the path of travel of the can body at an acute angle, thus providing a clearance space 19. This section of the solder roll 14 rotates in the solder bath, the same as the other sections. The can body 8 as it approaches the section 14 will contact with the first turn of the helical rib, and then the next, and so on, until it passes over the entire section. The helical rib on the solder roll is so disposed that the solder applied to the side seam of the can by the sections 5 and also by the section 14 will be retarded and fed back along the side seam. This results in an even distribution of the solder along the side seam. This distributing movement of the solder greatly aids in the applying of the solder to the front lap of the body. The section 14 with the helical rib may be of slightly larger diameter than the sections 5. It is also so constructed that the middle portion is of slightly greater diameter than the end portions of the section 14, and there is a proportioning of the diameters so that this section 14 is convex with the maximum diameter at the center. It is well known that when the side seam of a can body is heated, inasmuch as the heat is applied along the side seam only, it will curve. The shaping of the sections 5 and also the section 14 is to conform to this curvature of the side seam which results from the heating thereof. By this shaping of the sections of the solder roll, there is a time when the entire side seam from one end of the can body to the other is subjected to substantially a uniform contact with the solder applying sections of the roll.

The helical rib as above noted is so disposed that it feeds the solder back along the side seam and presents a larger quantity of solder to the highest point of the helix than is presented to the side seam by the highest point in section 5. This insures a more equal distribution of the solder along the side seam and thereby a more efficient bonding of the side seam. The passing of the can body over this helical rib also strips a greater portion of the surplus solder from the outer face of the can body. The solder stripped from the can body is returned to the solder bath and is thus re-claimed. When the can body leaves the solder roll, it contacts with the wiper indicated at 20 in the drawings. This wiper is of the usual construction and rotates in the direction of the arrow. As much of the surplus solder is removed from the side seam, there is less to be removed by the wiper, and therefore, there is very much less chance of the wiper throwing solder into the path of the traveling cans. The objectionable solder splashed on to the interior of the cans as they pass through the machine is almost wholly eliminated through the stripping of this surplus solder from the seam by the helical rib section 14 of the solder roll. While this helical rib is shown as applied to only one section of the solder roll, it may be applied to other sections. The section of the solder roll on which the rib is formed is preferably in the form of a sleeve or hollow cylinder fitted over the solder roll. The sleeve can be made of steel and hardened so as to prevent wear at its outer edge.

The section carrying the helical rib may be slightly larger than the sections which are plain and this will increase the pressure of the helical rib against the can body and remove more solder. While the section carrying the helical rib is shown as tapered both ways from the center thereof, the section of the rib opposite that approached by the can body may be made of uniform diameter. It is essential that the end of the section approached by the can body shall be tapered, as this tapered section gradually lifts the body to the highest point of the helix and thereby prevents the front end of the body from being bent or damaged by this reverse movement of the helical rib.

It will be obvious that the shaping of the ribs may be slightly varied and changes in the details of construction made without departing from the spirit of the invention as set forth in the appended claims.

Having thus described the invention, what I claim as new and desire to secure by Letters Patent, is—

1. A soldering mechanism including a solder bath, a solder applying roll rotating in said bath, means for feeding can bodies along said roll for applying solder to the side seam, said solder roll having a series of solid sections arranged in tandem and operating to apply solder to the side seam, and a section disposed on said solder roll so as to contact with the can bodies after the solid sections apply solder thereto, said last-named section having a helical rib disposed so as to engage the solder applied to the side seam for retarding and distributing the solder along said seam and stripping surplus solder from said can body.

2. A soldering mechanism including a solder bath, a solder applying roll rotating in said bath, means for feeding can bodies along said roll for applying solder to the side seam, said solder roll having a series of solder applying sections arranged in tandem and operating to apply solder to the side seam, a section disposed on the said solder roll so as to contact with the can bodies after the solder applying sections apply solder thereto, said last named section having a helical rib disposed so as to engage the solder applied to the side seam, said rib having the face thereof approached by the can body lying in a line substantially at right angles to the radius of the solder applying roll for retarding and distributing the solder along the side seam and stripping surplus solder from said can body side seam.

FRANK NATHAN PRINCE.